(12) United States Patent
Kim et al.

(10) Patent No.: US 8,273,315 B2
(45) Date of Patent: Sep. 25, 2012

(54) ENGINE EMISSION CONTROL SYSTEM

(75) Inventors: Jeong Yeol Kim, Troy, MI (US);
Giovanni Cavataio, Dearborn, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 12/853,075

(22) Filed: Aug. 9, 2010

(65) Prior Publication Data

US 2011/0162348 A1 Jul. 7, 2011

(51) Int. Cl.
*B01D 53/94* (2006.01)
*B01J 35/04* (2006.01)
*F01N 3/28* (2006.01)

(52) U.S. Cl. ........ 423/213.7; 60/301; 422/171; 422/180; 422/222

(58) Field of Classification Search .................. 422/171, 422/172, 180, 222; 60/295, 299, 301; 423/213.7
See application file for complete search history.

(56) References Cited

U.S. PATENT DOCUMENTS

| | | | |
|---|---|---|---|
| 3,853,485 A * | 12/1974 | Hogan | 502/300 |
| 5,108,685 A * | 4/1992 | Kragle | 264/177.12 |
| 5,445,786 A | 8/1995 | Harada et al. | |
| 5,538,697 A * | 7/1996 | Abe et al. | 422/171 |
| 5,934,069 A | 8/1999 | Hertl et al. | |
| 6,475,453 B1 * | 11/2002 | Mathes et al. | 423/239.1 |
| 6,508,852 B1 * | 1/2003 | Hickman et al. | 55/523 |
| 6,824,749 B2 * | 11/2004 | Leloup et al. | 422/220 |
| 7,159,390 B2 | 1/2007 | Saito et al. | |
| 7,380,395 B2 | 6/2008 | Brück et al. | |
| 7,491,373 B2 * | 2/2009 | Ketcham et al. | 423/213.2 |
| 2001/0046456 A1 | 11/2001 | Langer et al. | |
| 2002/0198429 A1 * | 12/2002 | Ramani et al. | 422/222 |
| 2003/0070424 A1 | 4/2003 | Verdegan et al. | |
| 2004/0258582 A1 * | 12/2004 | Miwa et al. | 422/177 |
| 2006/0008396 A1 * | 1/2006 | Wursthorn et al. | 422/180 |
| 2006/0230748 A1 | 10/2006 | Dalla Betta et al. | |
| 2009/0235653 A1 | 9/2009 | Mital et al. | |
| 2010/0005790 A1 | 1/2010 | Zhang | |

FOREIGN PATENT DOCUMENTS

GB 2342055 A * 4/2000
JP 7-233723 A 9/1995

* cited by examiner

*Primary Examiner* — Jill Warden
*Assistant Examiner* — Joye L Woodard
(74) *Attorney, Agent, or Firm* — Julia Voutyras; Alleman Hall McCoy Russell & Tuttle LLP

(57) ABSTRACT

Systems and methods are provided for reducing exhaust NOx species using a monolith substrate having a plurality of channels configured with radially varying cell density. An injector injects reductant into the substrate unobstructedly, without use of a mixer. In some embodiments, a twist angle of the channels is based on a distance from an inlet of the substrate and varies exponentially as a function of the distance.

14 Claims, 5 Drawing Sheets

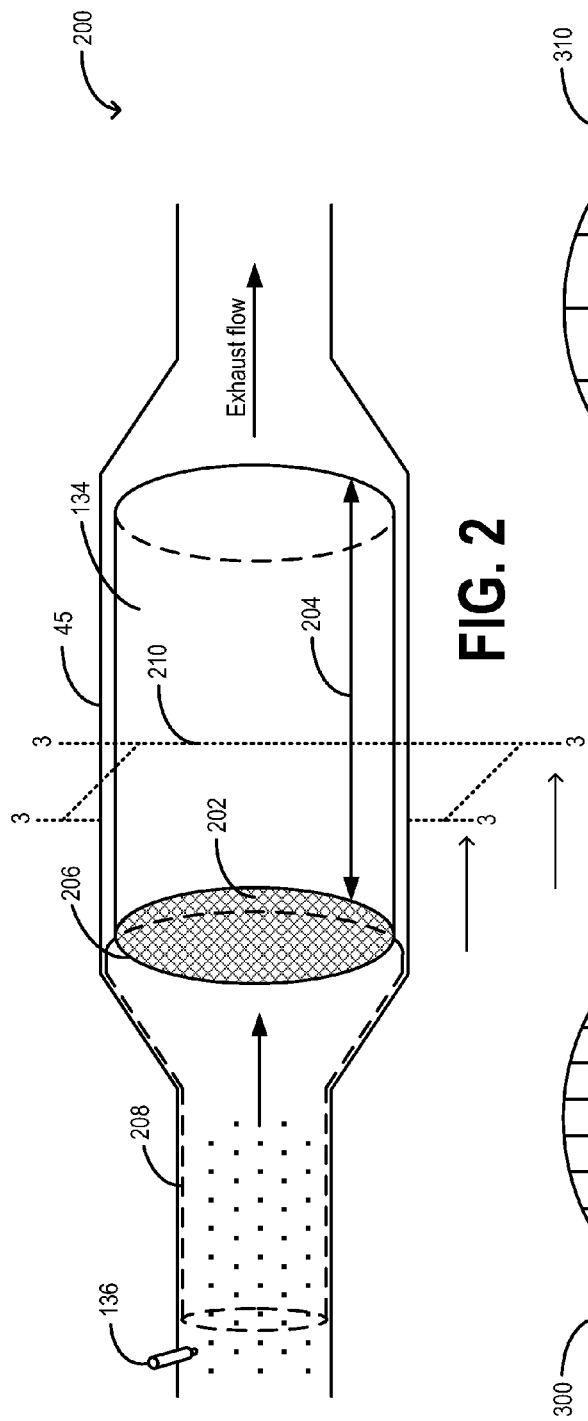
FIG. 2
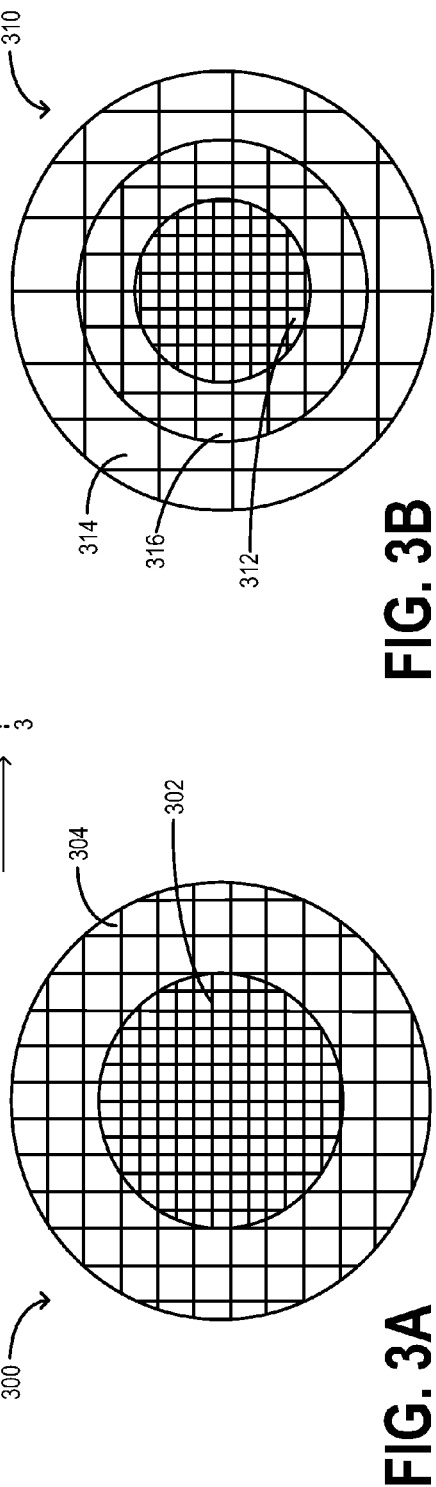
FIG. 3A
FIG. 3B

ENGINE EMISSION CONTROL SYSTEM

FIELD

The present application relates to an engine emission control system.

BACKGROUND AND SUMMARY

A technology such as Selective Catalyst Reduction (SCR) may be utilized for NOx reduction in engines and to achieve emissions compliance. In one approach, aqueous urea is sprayed into the exhaust gas stream which subsequently reacts with NOx species on the surface of an SCR catalyst, resulting in reduction of engine-out NOx emissions. For improved NOx reduction, the injected urea has to be spread evenly across the surface of the SCR catalyst.

Various approaches may be used to evenly disperse the injected reductant on the surface of the SCR catalyst. One example mixing approach is illustrated by Brück et al. in U.S. Pat. No. 7,380,395. Therein a mixer is included in the exhaust passage between the site of urea injection and the SCR catalyst so that the injected urea is atomized and sufficiently mixed with exhaust gas before it reaches the catalyst substrate. The approach of Brück also includes a filter element with microstructures located upstream of the mixer for generating turbulence to assist in urea mixing. In still other approaches, an atomizer may be included along with a mixer to further improve the atomization and mixing of injected urea with exhaust gas.

However the inventors of the present application have recognized potential issues with such an approach. As one example, the microstructures may not provide sufficient mixing and atomization of the injected urea. Consequently, the system may largely rely on the mixer for providing the desired urea mixing. As another example, the metallic atomizer and mixer can add substantial weight and cost to component manufacture. Additionally, various support structures may be required to hold the mixer and/or atomizer in place in the exhaust passage. The support structures, typically made of metallic materials, may also add further weight and cost to component manufacture. As still another example, the presence of a mixer and/or atomizer, along with the related support structure, can cause a drop in temperature from the time exhaust gas flows out of an upstream catalyst (such as a diesel oxidation catalyst) and into the downstream SCR catalyst. As a result of the drop in exhaust gas temperature, the SCR catalyst may take a longer time to light-off, leading to degraded exhaust emissions.

Accordingly, in one example, some of the above issues may be addressed by an emission control system coupled to an engine exhaust passage comprising a monolithic substrate having a plurality channels of varying cell density, a reductant injector positioned upstream of the substrate wherein injected reductant flows unobstructedly from the injector to the substrate, and an SCR catalytic washcoat positioned on the substrate or downstream of the substrate. It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 2 illustrates an example monolithic substrate with a plurality of channels included in the emission control system of FIG. 1;

FIGS. 3-5 depict example embodiments of the arrangement of the substrate's plurality of channels;

DETAILED DESCRIPTION

Figure 1:
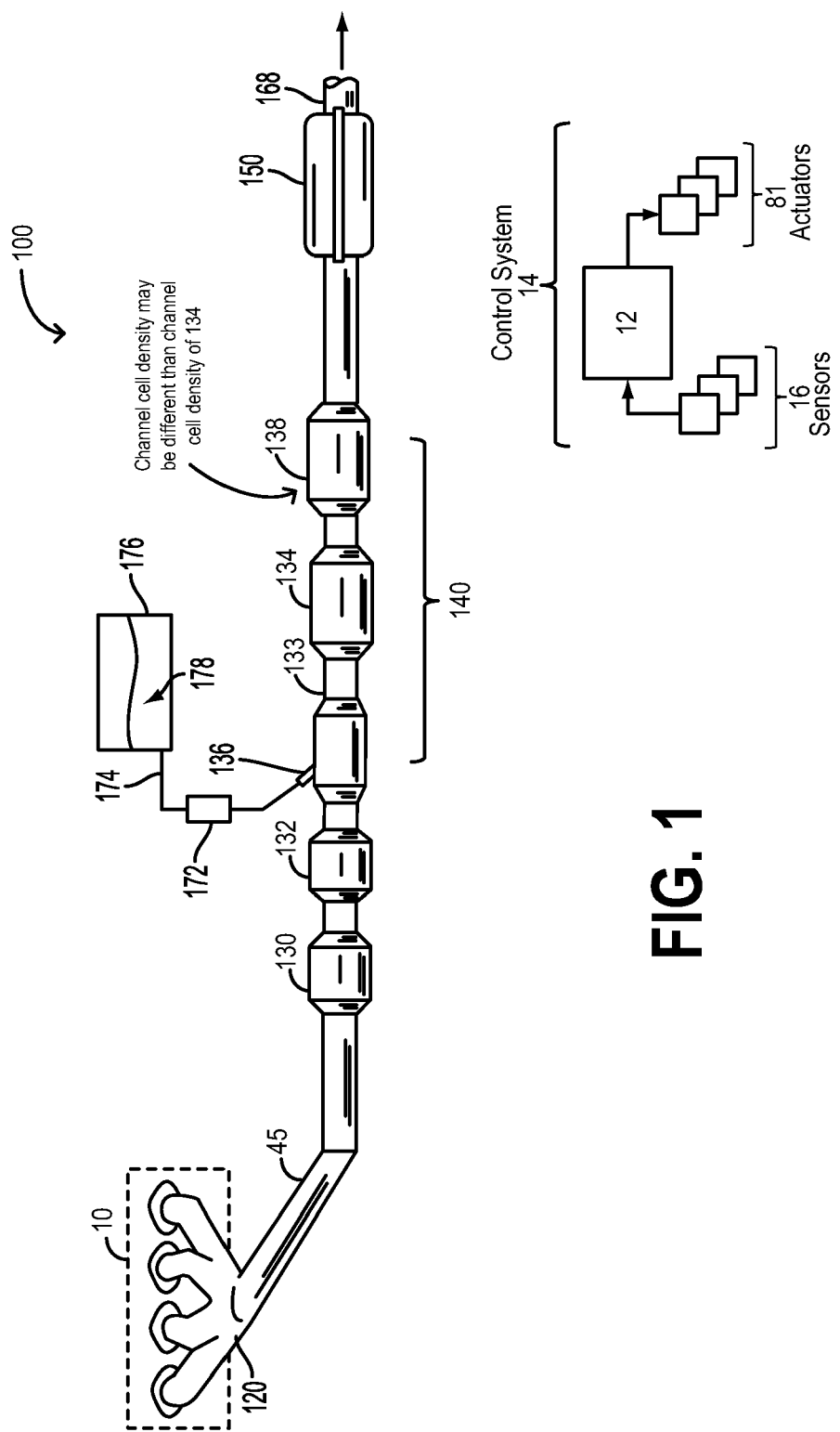
FIG. 1 illustrates an engine emission control system coupled to an engine exhaust passage.

The present disclosure relates to embodiments of an engine emission control system coupled to an exhaust passage, such as the system of FIG. 1. Such an emission control system may be utilized for NOx reduction in an exhaust stream. The emission control system may include a cylindrical monolithic substrate having a plurality of channels, as shown in FIG. 2, positioned downstream of a reductant injector. The plurality of channels may be configured with radially varying cell density, as shown in FIGS. 3-6. An engine controller may be configured to perform a routine, such as shown in FIG. 7, to inject an amount of reductant upstream of the substrate and flow exhaust gas though the substrate. The plurality of channels of radially varying cell density, in the monolithic substrate, generate a flow turbulence that advantageously mixes the injected reductant with the exhaust gas, thereby reducing the need for a dedicated mixer and/or atomizer. The mixed exhaust gas can then be flowed over an SCR catalytic washcoat, such as on the monolithic substrate and/or on a downstream substrate, to enable reduction of exhaust gas NOx species.

FIG. 1 illustrates an emission control system 100 coupled to an exhaust passage 45. Exhaust gas produced by one or more cylinders during the operation of engine 10 may be transported from exhaust manifold 120 into exhaust passage 45 wherein the various components of emission control system 100 may catalytically convert one or more components of the exhaust gas before releasing exhaust gas to the atmosphere through tailpipe 168. As one non-limiting example, engine 10 includes a diesel engine that produces a mechanical output by combusting a mixture of air and diesel fuel. Alternatively, engine 10 may include other types of engines such as gasoline burning engines, among others.

Emission control system 100 may include a plurality of emission control devices, such as a diesel oxidation catalyst 130, a diesel particulate filter 132, and an SCR catalyst 136. Additional catalytic converters may also be provided. Diesel oxidation catalyst (DOC) 130, arranged downstream of exhaust manifold 120, may be configured to oxidize at least some exhaust CO and hydrocarbons into $CO_2$ and water. Diesel particulate filter (DPF) 132, arranged downstream of DOC 130, may be configured to retain at least some exhaust particulate matter (PMs) or soot. In some embodiments, DPF 132 may be coupled to a regeneration device (e.g., burner or heater) for periodically regenerating the particulate filter by burning off the stored soot, thereby restoring the filter's storage capacity.

An SCR system 140 may be arranged downstream of DPF 132 for reducing at least some exhaust NOx species. As a non-limiting example, SCR system 140 may include a reductant injector 136 for injecting an amount of reductant into the exhaust passage, a first upstream monolithic substrate 134 and a second downstream substrate 138. A noise reduction device 150 may be coupled downstream of the SCR system 140 in exhaust passage 45.

Reductant injector 136 may selectively inject a reductant into the exhaust passage upstream of monolithic substrate 134. As one non-limiting example, the reductant injected by injector 136 may include a liquid reductant 178 such as ammonia or urea. The liquid reductant 178 may be supplied to injector 136 through conduit 174 from a storage tank 176 via an intermediate pump 172. However, in alternate embodiments, the injected reductant may be solid or gaseous urea. A free space 133 may be included between the tip of injector 136, at the site of injection, and the inlet of monolithic substrate 134 so that the injected reductant can flow unobstructedly from the injector to the substrate. In one example, the free space extends fully from the tip of the injector to the inlet surface, or face, of the substrate, as well as extending out fully to the interior surface of the exhaust passage.

Figure 4:
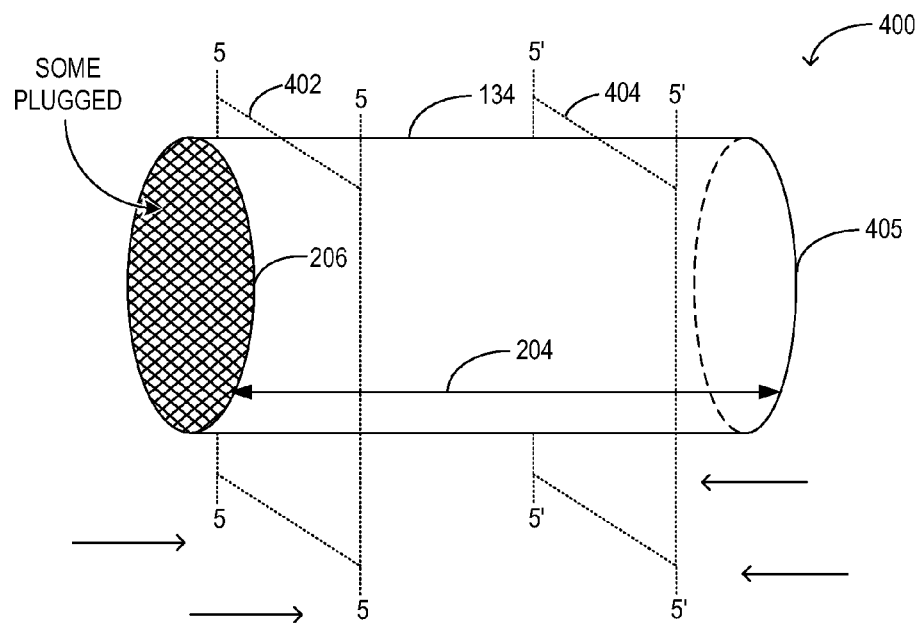

In one example, monolithic substrate 134 may be configured as a cylindrical substrate. However, it will be appreciated that in alternate embodiments, the substrate may be configured in an alternate shape, such as, rectangular for example. As further elaborated in FIGS. 2-4, monolithic substrate 134 may have a plurality of channels of varying cell density. At least some of the plurality of channels may be plugged, as shown in FIG. 4. In one example, every alternate channel may be plugged. The plurality of channels of varying cell density may be arranged such that a cell density of the channels varies radially. In one embodiment, as shown in FIGS. 3A-B, inner channels (that is, channels closer to a center of the cylindrical monolithic substrate) may have a higher cell density while outer channels (that is, channels closer to a periphery of the cylindrical monolithic substrate) may have a lower cell density. By situating channels having a higher open face area along the outer edges of the monolithic substrate, a higher fraction of exhaust gas flowing through the substrate may be trended towards the outer edges of the substrate. Consequently, flow turbulence (e.g., swirling effects) may be generated in the monolithic substrate that may enable radial mixing of exhaust gas with the injected reductant (herein, urea). In this way, urea mixing may be improved without the use of a dedicated atomizer and/or mixer. However, it will be appreciated that in alternate embodiments, an atomizer and/or mixer may be further included in the emission control system, for example, coupled downstream of the monolithic substrate, to further enhance urea mixing and atomization.

The depicted configuration also enables the monolithic substrate 134 to have a low thermal mass, for example, a lower thermal mass than downstream substrate 138. The monolithic substrate 134 may also have a lower thermal mass than a dedicated reductant mixers and atomizers. As such, the lower thermal mass of the monolithic substrate also reduces the need for additional support structure. Thus, by reducing the thermal mass of the substrate, as well as the need for dedicated mixers, atomizers and/or related support structure, component reduction benefits may be achieved. Additionally, a drop in exhaust gas temperature between the (upstream) DOC and the (downstream) monolithic substrate may be reduced, thereby expediting attainment of SCR catalyst light-off temperatures, and improving exhaust emissions.

In one embodiment, an SCR catalytic washcoat may be optionally positioned on the monolithic substrate. The SCR catalytic washcoat may include zeolites, such as metal-impregnated zeolites. However, the catalytic washcoat may alternatively include any catalyst suitable for reducing NOx. By including an SCR catalytic washcoat on the monolithic substrate, in addition to improved urea mixing, the injected urea may also be evenly dispersed across the surface of the SCR catalyst coated substrate. That is, in this embodiment, monolithic substrate 134 may be configured to reduce at least some exhaust NOx species in addition to mixing exhaust gas with the injected reductant.

In another embodiment, instead of (or in addition to) an SCR catalytic washcoat, an alternate catalytic washcoat may be included on monolithic substrate 134. The alternate catalytic washcoat may include, for example, a thermolysis or hydrolysis boosting catalyst. The selected catalytic coating may be suitable for treating an alternate exhaust gas combustion product resulting from the combustion of fuel by engine 10 (that is, a combustion product other than NOx). In still other embodiments, monolithic substrate 134 may also have a porosity so that at least some exhaust PMs can be trapped, or retained, in the plurality of channels of the substrate.

In some embodiments of emission control system 100, a second downstream substrate 138 having a plurality of channels may be included downstream of monolithic substrate 134. In comparison, the plurality of channels of downstream substrate 138 may have uniform cell density. Additionally, the cell density of the channels of the downstream substrate may be different from the cell density of the channels of the monolithic substrate, as shown in FIG. 1. An SCR catalytic washcoat may be positioned on the downstream substrate so that at least some NOx species in the mixed exhaust gas, that is, exhaust gas mixed with urea upon flowing through the monolithic substrate, may be reduced upon flow through the downstream substrate.

Emission control system 100 may further include control system 14. Control system 14 is shown receiving information from a plurality of sensors 16 and sending control signals to a plurality of actuators 81. As one example, sensors 16 may include an exhaust gas sensor (located in exhaust manifold 120), various temperature sensors and pressure sensors (located upstream and/or downstream of DOC 130, DPF 132, and SCR system 140), one or more NOx sensors (located upstream and/or downstream of the substrates of SCR system 140), etc. Other sensors such as additional pressure, temperature, air/fuel ratio, and composition sensors may be coupled to various locations in the emission control system 100. As another example, the actuators may include reductant injector 136, pump 172, burners and/or heaters for DPF regeneration, various valves (not shown), etc. The control system 14 may include a controller 12. The controller may receive input data from the various sensors, process the input data, and trigger the actuators in response to the processed input data based on instruction or code programmed therein corresponding to one or more routines. An example control routine is described herein with reference to FIG. 7.

Note that with regards to vehicle applications, emission control system 100 may be arranged on the underside of the vehicle chassis. Additionally, it should be appreciated that in some embodiments, emission control system 100 may include additional components not illustrated in FIG. 1 and/or may omit components described herein.

It will be appreciated that components previously introduced in FIG. 1 may be similarly numbered in the following figures, and may not be reintroduced.

FIG. 2 shows a zoomed-in view 200 of the monolithic substrate 134 of FIG. 1 within exhaust passage 45. As shown, monolithic substrate 134 may be configured to be cylindrical in shape, although different shapes may be used in alternate embodiments. Reductant injector 136 positioned upstream of cylindrical monolithic substrate 134, may inject a reductant, such as liquid urea, upstream of the substrate. A free space 208 (indicated by dotted lines) may be present between the injector 136 and the monolithic substrate so that the injected reductant can flow unobstructedly from the site of injection to an inlet 206 of the substrate 134. Specifically, free space 208 may represent an area in the exhaust passage extending, in length, from a tip of the reductant injector 136 to a surface on the inlet 206 of monolithic substrate 134. Free space 203 may also extend laterally towards the surface of exhaust passage 45 so as to have a diameter substantially equal to the diameter of the exhaust passage. In the depicted example, a diameter of exhaust passage 45 at a region surrounding cylindrical monolith substrate 134 may be larger than the diameter of the exhaust passage at a region near the reductant injector 136 and the site of injection. Accordingly, free space 203 may also have a smaller diameter at the end near the tip of injector 136 and a larger diameter at the end near the inlet 206 of monolithic substrate 134.

Substrate 134 may include a plurality of channels 202 along the length 204 of the substrate. In one example, as shown in FIG. 3, each channel may have a rectangular cross section. However, in alternate embodiments, the cross section of the channels may have a different shape, such as a honeycomb structure, for example. Additionally, the plurality of channels may have a varying cell density. Specifically, the cell density may vary radially, as shown by sectional views, along line 3-3, of monolithic substrate 134, in FIG. 3

Turning to FIG. 3, it depicts example embodiments of the arrangement of channels in the monolithic substrate with a radial variation in cell density. Specifically, FIG. 3 represents example sectional views of monolithic substrate 134 taken along plane 210 (FIG. 2), that is, along dotted lines 3-3 (FIG. 2). FIG. 3 shows a first embodiment 300 of the plurality of channels of monolithic substrate 134 of radially varying cell density. Herein, the plurality of channels may be arranged such that the inner channels 302 (that is, the channels at or near the center of the substrate) have a first, higher cell density (e.g., 400 cpsi) while the outer channels 304 (that is, the channels at or near the periphery of the substrate) have a second, lower cell density (e.g., 50 cpsi). While the first embodiment 300 of FIG. 3 shows the plurality of channels arranged into two regions of varying cell density, it will be appreciated that in alternate embodiments, the plurality of channels may be divided into a larger number of regions of varying cell density. As a non-limiting example, the second embodiment 310 of FIG. 3 shows the plurality of channels arranged with a first inner region 312 at or near the center of the substrate having a first, higher cell density, a second outer region 314 at or near the periphery of the substrate having a second, lower cell density, and a third intermediate region 316, positioned between inner region 312 and outer region 314 having a third intermediate cell density. As shown, the third intermediate cell density may be lower than the first cell density of the first inner region 312 and greater than the second cell density of the second outer region 314.

While the depicted example shows a single intermediate region, in alternate embodiments, a larger number of intermediate regions may be included between the center and the periphery of the monolithic substrate. In one example, the cell density may vary gradually in the radial direction (for example, gradually from 400 cpsi at the center to 50 cpsi at the periphery). In another example, the cell density may vary step-wise in the radial direction (for example, step-wise from 400 cpsi at the center to 50 cpsi at the periphery). Further, while the embodiments of FIG. 3 show the radially varying cell density distributed substantially uniformly in a radial direction, it will be appreciated that in alternate embodiments, the cell density may vary non-uniformly in the radial direction.

In this way, by configuring the substrate with a higher cell density of channels at the center and a lower cell density near the outer edges, a higher fraction of exhaust flow can be trended towards the outer edges, thereby providing sufficient turbulence to improve mixing of the injected reductant with exhaust gas at the monolithic substrate.

FIG. 4 shows another example embodiment 400 of monolithic substrate 134 wherein the plurality of channels with radially varying cell density further have a twist along a length 204 of the substrate 134. The twist may be seen by comparing the position of a selected channel in a first sectional view, taken across a first end of the substrate (closer to the inlet 206 of the substrate) along line 5-5, with a second sectional view, taken across a second end of the substrate (closer to an outlet 405 of the substrate), along line 5'-5'. A non-limiting example of such a comparison is shown in FIG. 5.

Figure 5:
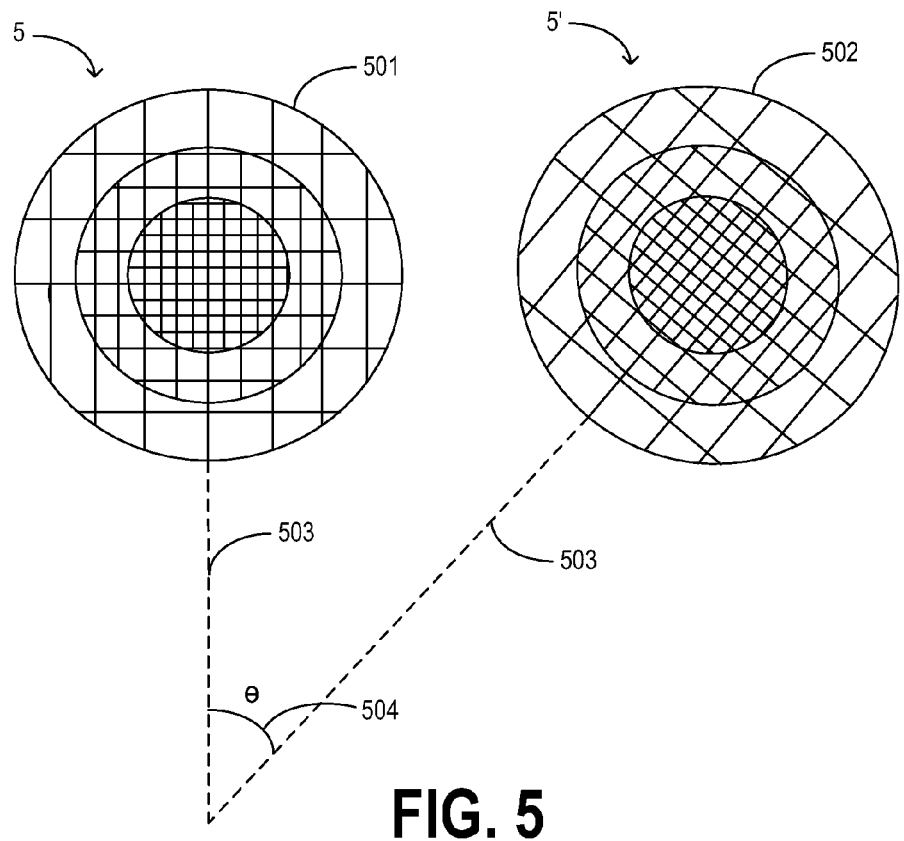

Turning to FIG. 5, it illustrates a first cross sectional view 501 of the monolithic substrate 134 along plane 402 (FIG. 4), that is, along dotted lines 5-5 (FIG. 4), at a first region closer to the inlet 206 of the substrate. FIG. 5 further illustrates a second cross sectional view 502 of the monolithic substrate 134 along plane 404 (FIG. 4), that is, along dotted lines 5'-5' (FIG. 4), at a second region closer to an outlet 405 of the substrate. As can be seen by comparing the position of a selected channel in first sectional view 501 with the position of the same channel in second sectional view 502, for example along axis 503, the channels may progressively twist along the length of the substrate, that is, from the inlet end to the outlet end. The twist of the channels may be defined by a twist angle 504 (herein also referred to as θ). Thus, a first channel positioned along plane 402 (FIG. 4) near the inlet of the substrate 134 may be twisted by twist angle 504 from a second channel along plane 404 (FIG. 4) near the outlet of the substrate, the twist angle 504 measured along a lateral axis 503.

Figure 6:
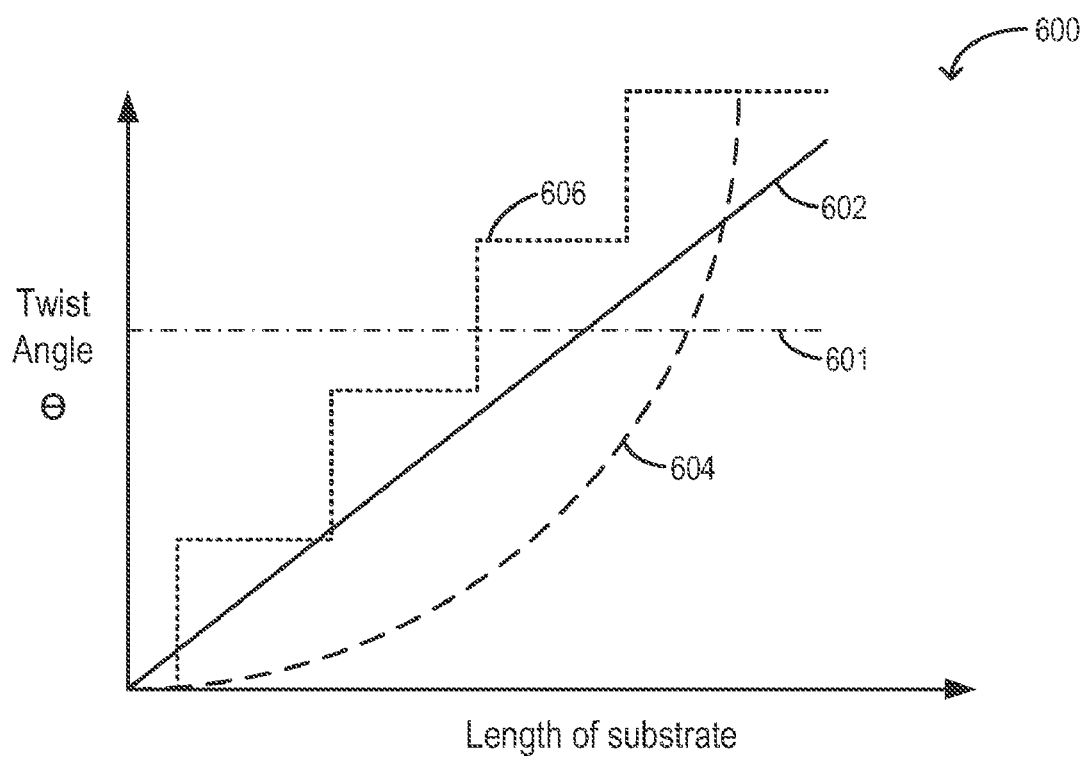
FIG. 6 illustrates example variations twist angle along the length of the substrate.
Figure 7:
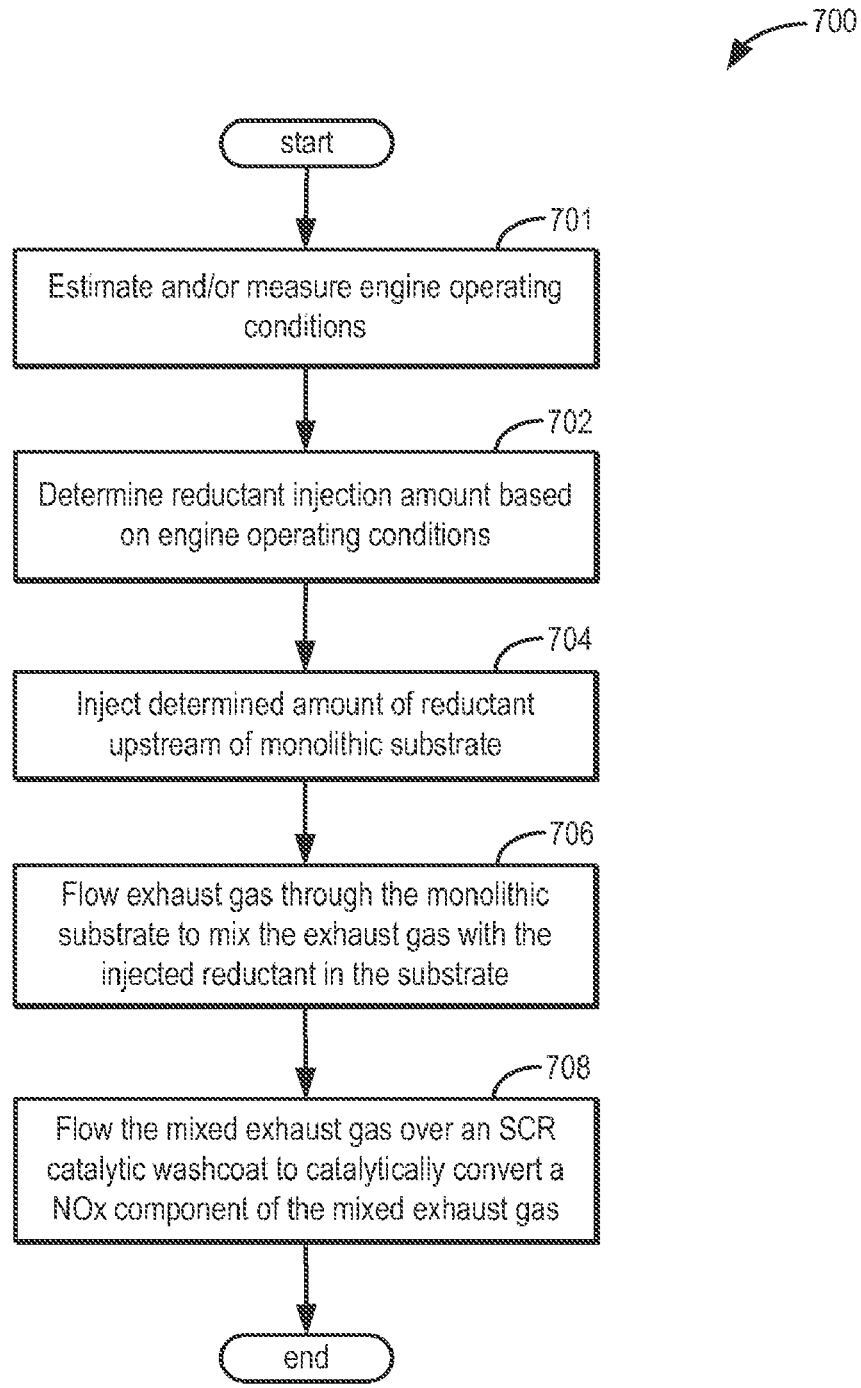
FIG. 7 depicts an example method of operating the emission control system of FIG. 1.

FIG. 6 shows a map 600 depicting example variations in a twist angle θ of the plurality of channels along a length of the monolithic substrate. In one example, as shown by line 601, the twist angle may remain constant along the length of the substrate. In another example, as shown by lines 602, 604, 606, the twist angle may vary along the length of the substrate, as a function of the length of the substrate. That is, a twist angle of the channel rotation may vary such that a twist angle for a given channel is based on a distance of the channel from the inlet of the monolithic substrate. For example, the twist angle may vary linearly along the length of the substrate, as shown in line 602. Alternatively, the twist angle may vary exponentially along the length of the substrate, as shown in line 604. In another example, as shown in line 606, the twist angle may vary so as to provide a substantially zig-zag distribution of cell density. In still another example, the twist angle may follow an angle commonly used in twister reductant mixer blades. In yet other examples, the twist angle may vary as an alternate function of the length of the substrate.

Now turning to FIG. 7, a routine 700 is described for operating the emission control system of FIG. 1 to enable reduction of at least some NOx species in the exhaust gas stream. In one example, the routine of FIG. 7 may be performed by an engine controller in response to an exhaust NOx level exceeding a threshold, an exhaust gas temperature exceeding a threshold (such as a light-off temperature), and/or after a threshold duration of engine operation.

At 701, the routine includes estimating and/or measuring engine operating conditions. These may include, for example, engine speed, load, torque, engine temperature, exhaust temperature, exhaust NOx levels, etc. At 702, a reductant injection amount may be determined based on the estimated engine operating conditions. At 704, the determined amount of reductant may be injected by the reductant injector upstream of a first (upstream) monolithic substrate such that the injected amount of reductant flows unobstructedly from the injector into the substrate. At 706, exhaust gas may be flowed through the plurality of channels of the monolithic substrate to mix the exhaust gas with the injected reductant. A swirling effect and/or local turbulence may be created in the monolithic substrate due to the radially varying cell density of the channels so as to improve the atomization of the injected reductant and the mixing of the atomized reductant with the exhaust gas. At 708, the reductant mixed exhaust gas may be flowed over an SCR catalytic washcoat to catalytically convert a NOx component of the mixed exhaust gas. In one example, where the SCR catalytic washcoat is included on the monolithic substrate, at least some exhaust NOx species may be reduced at the monolithic substrate. In another example, where the SCR catalytic washcoat is included on a second substrate positioned downstream of the first monolithic substrate, the controller may further flow the mixed exhaust gas through the second substrate so that at least some exhaust NOx species may be reduced at the second downstream substrate.

In this way, by using a monolithic substrate for urea mixing, a lower thermal mass "mixer" may be provided that can be used in place of, or in addition to, heavier and bulkier mixers and atomizers. By arranging the plurality of channels of the monolith substrate with radially varying cell density, radial urea mixing and even dispersion of urea across the SCR catalyst may be enabled. Specifically, by configuring the channels with a higher cell density near the center of the substrate and a lower cell density near the periphery of the substrate, a larger fraction of exhaust gas flow may be trended towards the outer edges of the substrate, thereby improving mixing of urea with the exhaust stream, without the use of a dedicated mixer or atomizer. By reducing the need for a dedicated mixer, and the related support structure, component reduction benefits may be achieved. Additionally, by reducing the thermal mass of the mixing device and the number of components required for mixing, exhaust gas temperatures may be maintained, thereby expediting the attainment of an SCR catalyst light-off temperature. Note that while in the illustrated examples the radial variation starts from a center point, a center of the varying cell density may be offset from the geometric center of the face of the brick, if desired.

By further including one or more catalytic washcoats, or coatings, on the surface of the substrate, more even dispersion of the injected urea on the surface of the SCR catalyst may be achieved, thereby enhancing the catalytic performance of the substrate. For example, by including an SCR catalytic washcoat on the surface of the substrate, at least some exhaust NOx species may be reduced on the substrate. Similarly, by including an alternate catalytic washcoat on the surface of the substrate, catalytic reactions, such as hydrolysis or thermolysis, may be boosted, and the treatment of at least some exhaust components may be improved. Further still, by plugging at least some of the channels of the substrate (such as alternate channels), and by including a porosity in the substrate, at least some exhaust PMs may be retained in the substrate. In this way, exhaust emissions may be improved.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein.

The invention claimed is:

1. A method of operating an emission control system coupled to an exhaust passage of an engine, comprising:
    injecting an amount of reductant upstream of a first monolithic cylindrical substrate having a plurality of channels of radially varying cell density, the radial variation including inner channels with a higher cell density and outer channels with a lower cell density, the injected amount of reductant flowing unobstructedly from an injector into the first substrate without use of a mixer;
    flowing exhaust gas through the first substrate to mix the exhaust gas with the injected reductant; and
    flowing the mixed exhaust gas over an SCR catalytic washcoat to catalytically convert a component of the mixed exhaust gas,
    wherein the channels are along a length of the first substrate, and wherein the channels are rotated progressively along a lateral axis along the length of the first substrate, a twist angle of the rotation varying exponentially as a function of a distance from an inlet of the first substrate.

2. The method of claim 1, wherein in addition to the SCR catalytic washcoat over which the mixed exhaust gas flows, another SCR catalytic washcoat is included on the first substrate.

3. The method of claim 2, wherein flowing the mixed exhaust gas over the SCR catalytic washcoat includes flowing the mixed exhaust gas through a second substrate positioned downstream of the first substrate, the SCR catalytic washcoat included on the second substrate.

4. An emission control system of an engine exhaust passage, comprising:
    a monolithic-substrate having channels of varying cell density extending from an inlet end to an outlet end of the monolithic-substrate with a channel twist angle varying exponentially as a function of monolithic-substrate length;
    a downstream-substrate;
    an upstream injector to inject reductant to flow unobstructedly to the monolithic-substrate without use of a mixer via an upstream reductant injector; and
    an SCR catalytic washcoat on the monolithic-substrate or on the downstream-substrate.

5. The system of claim 4, wherein the catalytic washcoat includes zeolites.

6. The system of claim 4, wherein the monolithic-substrate is cylindrical and wherein the cell density of the channels varies radially with inner channels having a higher cell density and outer channels having a lower cell density.

7. The system of claim 6, wherein the channels are rectangular in cross-section.

8. The system of claim 7, wherein at least some of the channels are plugged.

9. The system of claim 8, wherein the downstream-substrate has a plurality of channels, and wherein an SCR catalytic washcoat is positioned on the downstream-substrate, a cell density of the channels of the downstream-substrate different from the cell density of the channels of the monolithic-substrate.

10. The system of claim 4, wherein the reductant is urea or ammonia.

11. The system of claim 4, wherein the monolithic-substrate has a lower thermal mass than the downstream-substrate.

12. An emission control system coupled to an exhaust passage of an engine, comprising:
   a monolithic upstream substrate having a plurality of channels of varying cell density, the channels formed within the upstream substrate and having a length extending between an inlet end of the upstream substrate and an outlet end of the upstream substrate, the cell density varying radially through the upstream substrate with a higher cell density at a center of the upstream substrate and a lower cell density at a periphery of the upstream substrate, the channels twisted along the length of the channels, where a twist angle of the channels is based on a distance from the inlet of the upstream substrate and varies exponentially as a function of the distance, and where a position of a selected channel at the inlet end is twisted with respect to a position of the selected channel at the outlet end;
   a reductant injector positioned upstream of the upstream substrate for injecting reductant that flows unobstructedly from the injector to an inlet of the upstream substrate without use of a mixer;
   a downstream substrate having a plurality of channels of uniform cell density; and
   an SCR catalytic washcoat coated on the downstream substrate and the upstream substrate.

13. The system of claim 12, wherein the upstream substrate is cylindrical and a cross section of each channel is rectangular.

14. The system of claim 13, wherein a first end of a channel at the inlet of the upstream substrate is twisted by an angle from a second end of the channel at an outlet of the upstream substrate, the angle measured along a lateral axis of the upstream substrate.

* * * * *